(12) United States Patent
Chandrasekaran et al.

(10) Patent No.: US 8,891,538 B2
(45) Date of Patent: Nov. 18, 2014

(54) STATE SYNCHRONIZATION OF SERIAL DATA LINK SESSIONS CONNECTED ACROSS AN IP NETWORK

(75) Inventors: Ravikumar S. Chandrasekaran, Bangalore (IN); Jean-Philippe Vasseur, Saint Martin dUriage (FR); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 625 days.

(21) Appl. No.: 12/911,494

(22) Filed: Oct. 25, 2010

(65) Prior Publication Data
US 2012/0026900 A1 Feb. 2, 2012

(30) Foreign Application Priority Data
Jul. 30, 2010 (IN) .......................... 1796/DEL/2010

(51) Int. Cl.
*H04L 12/28* (2006.01)
*H04L 12/24* (2006.01)
*H04L 12/26* (2006.01)

(52) U.S. Cl.
CPC ........ *H04L 41/0672* (2013.01); *H04L 43/0811* (2013.01)
USPC ........... 370/401; 370/402; 370/403; 370/404; 709/208; 709/224; 709/225

(58) Field of Classification Search
USPC .......... 370/316, 242, 252, 401–404; 709/208, 709/224, 225
See application file for complete search history.

(56) References Cited

U.S. PATENT DOCUMENTS

| 6,006,268 | A | 12/1999 | Coile et al. |
|---|---|---|---|
| 6,298,380 | B1 | 10/2001 | Coile et al. |
| 6,492,880 | B1 | 12/2002 | Chiappe et al. |
| 6,760,301 | B1 | 7/2004 | Falk |
| 7,430,215 | B2 | 9/2008 | Arivoli et al. |
| 7,451,193 | B1 | 11/2008 | Coile et al. |
| 7,509,431 | B2 | 3/2009 | Singhal et al. |
| 7,653,526 | B1 * | 1/2010 | Ryle et al. ........................ 703/23 |

(Continued)

OTHER PUBLICATIONS

"Notification of Transmittal of the International Search Report and the Written Opinion of the International Searching Authority, or the Declaration," International Filing Date: Jul. 25, 2011, International Application No. PCT/US2011/001306, Applicant: Cisco Technology, Inc., Date of Mailing: Nov. 28, 2011, pp. 1-10.
Bushby, Steven T.,"BACnet™ : A Standard Communication Infrastructure for Intelligent Buildings," Elsevier Science Publishers, Automation is Construction, vol. 6, No. 5-6, Sep. 1, 1997, pp. 529-540.

(Continued)

*Primary Examiner* — Mark Rinehart
*Assistant Examiner* — Mang Yeung
(74) *Attorney, Agent, or Firm* — Novak Druce Connolly Bove + Quigg LLP

(57) ABSTRACT

In one embodiment, a router maintains a communication session between a local terminal unit and a remote terminal unit, the local terminal unit interconnected to the router over a local serial data link, and the remote terminal unit interconnected to the router over an Internet Protocol (IP) session via a remote router and a corresponding remote serial data link. The router may then monitor a state of the local serial data link, and communicates this state with the remote router over the IP session, as well as a remote state of the remote serial data link. The router may then correspondingly control the state of the local serial data link to match the remote state of the remote serial data link.

23 Claims, 6 Drawing Sheets

(56) References Cited

U.S. PATENT DOCUMENTS

| | | |
|---|---|---|
| 7,707,240 B2 | 4/2010 | Marascio et al. |
| 7,729,290 B2 | 6/2010 | Saleh et al. |
| 7,808,890 B2 | 10/2010 | Shand et al. |
| 7,809,126 B2 | 10/2010 | Marascio et al. |
| 2008/0034409 A1 | 2/2008 | O'Rourke et al. |

OTHER PUBLICATIONS

Chandrasekaran, et al., "State Synchronization of Serial Data Link Sessions Connected Across an IP Networks", Indian Patent Application Serial No. 1796/DEL/2010, filed Jul. 30, 2010, 32 pages.

* cited by examiner

STATE SYNCHRONIZATION OF SERIAL DATA LINK SESSIONS CONNECTED ACROSS AN IP NETWORK

RELATED APPLICATION

The present application claims priority to commonly owned Indian Patent Application Serial No. 1796/DEL/2010, entitled "State Synchronization of Serial Data Link Sessions Connected Across an IP Networks", by Chandrasekaran, et al., on Jul. 30, 2010, the contents of which are incorporated by reference.

TECHNICAL FIELD

The present disclosure relates generally to computer networks, and, more particularly, to serial data links separated by an Internet Protocol (IP) network.

BACKGROUND

Many serial data links between two end points, such as modem connections, have recently been transported over (e.g., separated by) a heterogeneous Internet Protocol (IP) network for a variety of well understood reasons. For example, utility devices (e.g., meters, sensors, etc.) that have traditionally been interconnected over serial protocols (e.g., IEC-60870-5-101, a.k.a. "IEC-101" or "T-101") have been transported over an IP network using an IP-ready protocol (e.g., IEC-60870-5-104, a.k.a. "IEC-104" or "T-104"). Generally, this is accomplished by interconnecting the end points with respective routers, which may translate the serial transmissions to IP transmissions, and vice versa, thus emulating to the end points as if they were communicating directly with each other.

One problem associated with this approach, is that a conventional operation of many serial links is to re-initialize (e.g., shut down, restart, etc.) an associated session in the event of an encountered problem. When not directly connected, however, this initialization/restart sequence is lost in translation, since the communication is buffered by router emulation of the serial (e.g., IEC-101) remote endpoint. In other words, if there are issues at a first end point, the other end point may not be aware of the same issue, thus not knowing whether the first end point is up or down. This may result in wasted time and resources, trying to restart sessions with the emulating router (rather than the opposing end point), consuming resources that may be beneficial for sessions without problems (e.g., so as to not reduce available speed or bandwidth of the router to service other end points).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a router maintains a communication session between a local terminal unit and a remote terminal unit, the local terminal unit interconnected to the router over a local serial data link, and the remote terminal unit interconnected to the router over an Internet Protocol (IP) session via a remote router and a corresponding remote serial data link. The router may then monitor a state of the local serial data link, and communicates this state with the remote router over the IP session, as well as a remote state of the remote serial data link. The router may then correspondingly control the state of the local serial data link, when controllable, to match the remote state of the remote serial data link. In this manner, serial communication states on either end of an IP connection may be synchronized in order to avoid problems associated with separated serial sessions.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" (e.g., capacity and performance) of each network.

Figure 1:
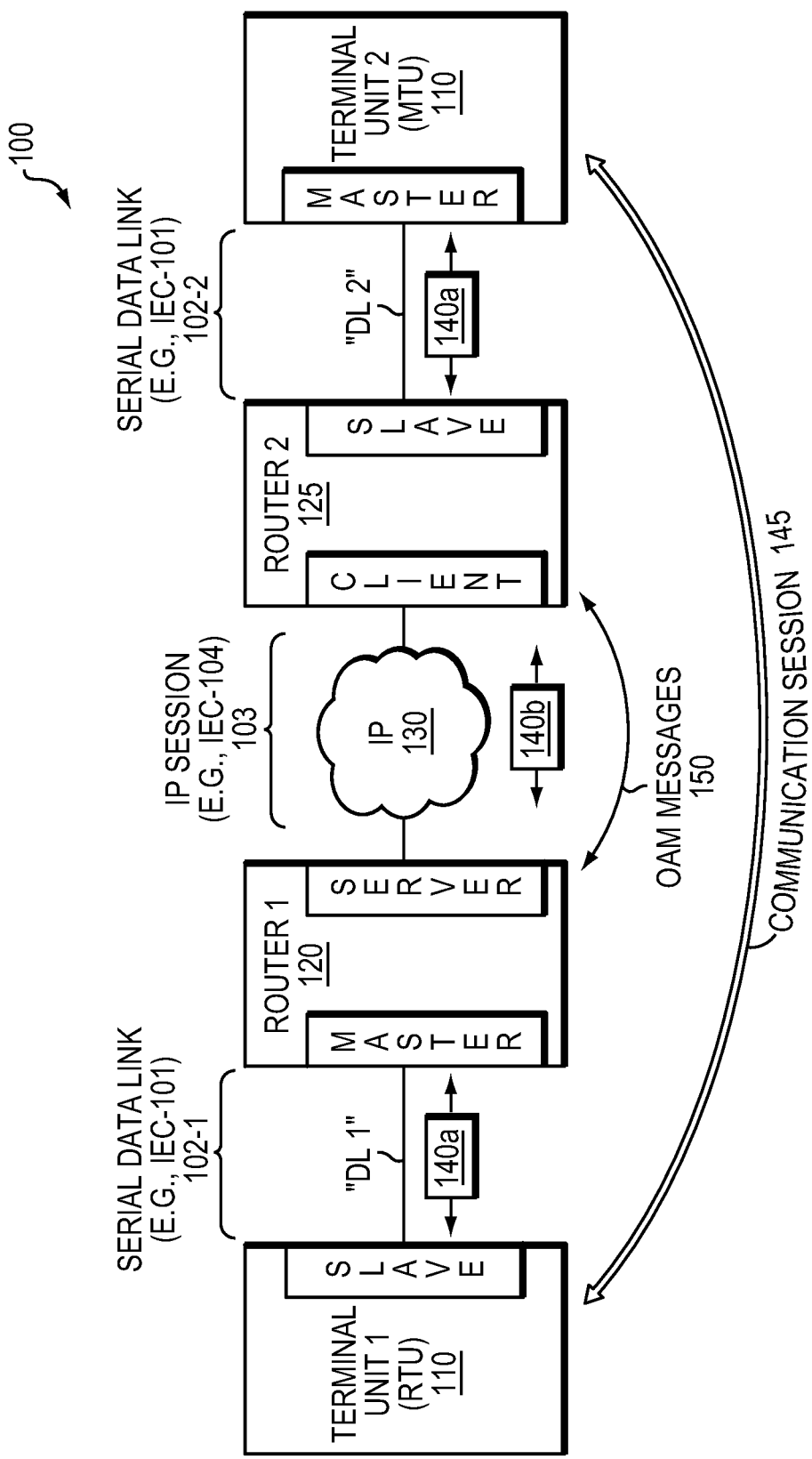
FIG. 1 illustrates an example computer network.

FIG. 1 is a schematic block diagram of an example computer network 100 illustratively comprising nodes/devices, such as first and second terminal units 110 and 115, respectively, interconnected via first and second routers 120 and 125, respectively, as shown. For example, illustrative terminal units may comprise a "remote terminal unit" (RTU, shown as 110) generally configured as a utility device meant to interconnect to various actuators, meters, sensors, etc., and or a "master terminal unit" (MTU, shown as 115) generally located at a supervisory control and data acquisition (SCADA) center. As described in more detail herein, each terminal unit may be interconnected to a translating router via a serial data link and corresponding serial data link (collectively, 102). The translating routers may in turn be interconnected to each other over the Internet 130 through an IP session 103. The two end points as shown may thus communicate over a communication session 145, as described in more detail below. Those skilled in the art will understand that any number of nodes, devices, links, etc. may be used in the computer network, and that the view shown herein is for simplicity.

Data 140 (e.g., packets, traffic, messages, signals, etc.) may be exchanged among the nodes/devices of the computer network 100 using predefined network communication protocols depending upon the type of interface/network between the communicating devices. For example, data 140*a* may be signals transmitted serially using various serial communication protocols (e.g., modems), while data/packets 140*b* may be exchanged using various IP protocols or other suitable protocols as may be appreciated by those skilled in the art (e.g., TCP/IP, User Datagram Protocol (UDP), Asynchronous Transfer Mode (ATM) protocol, Frame Relay protocol, Internet Packet Exchange (IPX) protocol, etc.). Illustratively, session protocols, operating on top of the underlying physical transmission protocols, may be selected according to the underlying physical protocol and desired functionality. For example, as described herein, an example serial data link protocol used for utility devices (meters, sensors, etc.) is IEC-101, while an example IP session protocol to interconnect the serial data links is IEC-104. Other types of session protocols may be used, and those mentioned herein are merely illustrative.

Figure 2:
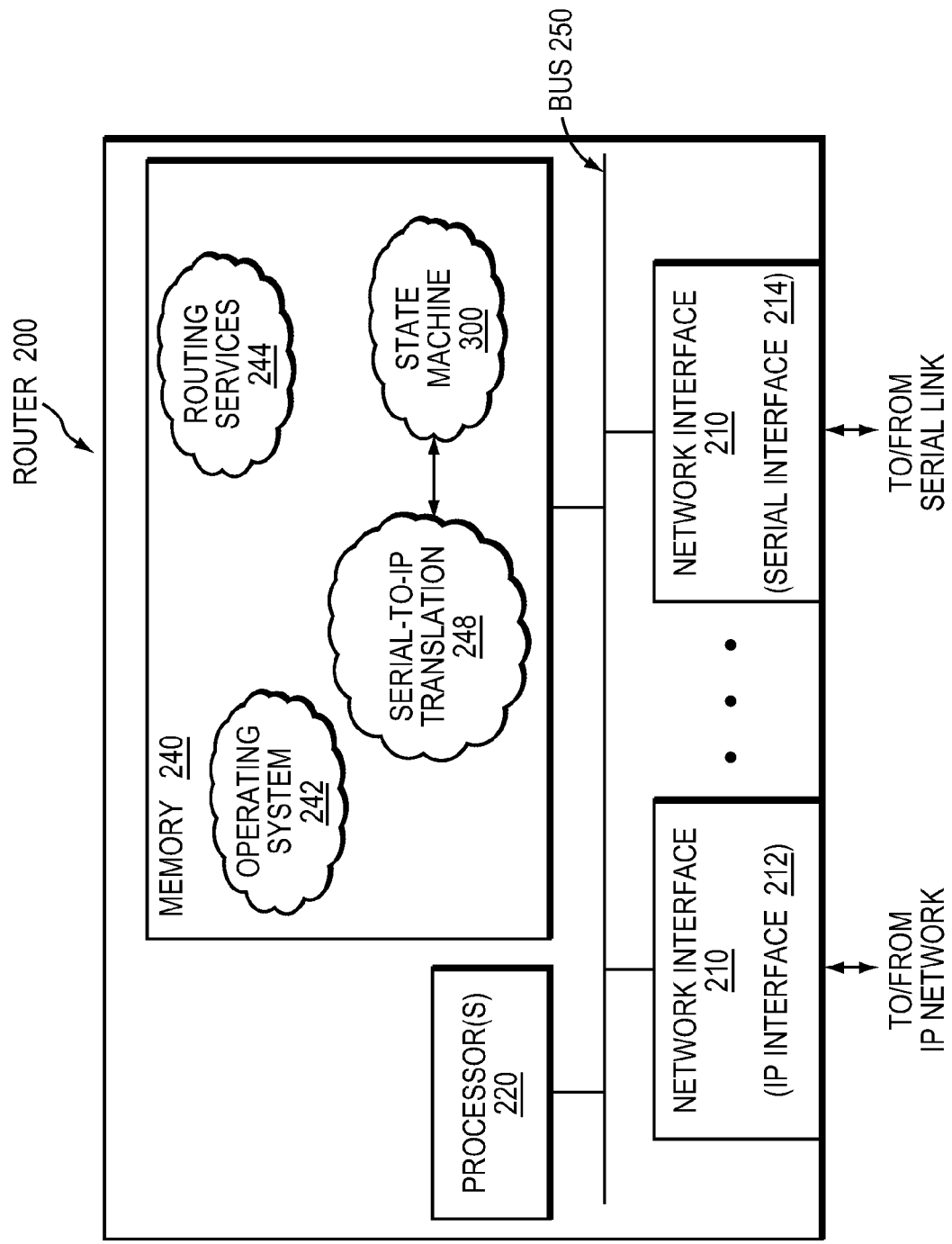
FIG. 2 illustrates an example network device/node.

FIG. 2 is a schematic block diagram of an example node/device 200 that may be used with one or more embodiments described herein, e.g., as routers 120 and 125. The device comprises a plurality of network interfaces 210, one or more processors 220, and a memory 240 interconnected by a system bus 250. The network interfaces 210 contain the mechanical, electrical, and signaling circuitry for communicating data over physical or wireless links coupled to the network. The network interfaces 210 may be configured to specifically transmit and/or receive data using a variety of different communication protocols, such as IP protocols over an IP network interface 212 and serial data link protocols over a serial data link network interface 214.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and a "serial-to-IP translating" process 248, illustratively comprising one or more state machines 300 described below. It will be apparent to those skilled in the art that other types of processors and memory, including various computer-readable media, may be used to store and execute program instructions pertaining to the techniques described herein.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining Virtual Routing and Forwarding (VRF) instances or tunneling protocols, such as for Multi-Protocol Label Switching, etc., each as will be understood by those skilled in the art.

Currently many utility companies have deployed serial communication links, e.g., IEC-101 over telephony/modem connections, in their distribution grids, such as electric utilities for the purpose of substation automation. As these communication links are upgraded to use IP as the preferred transport, many utility companies are led to deploy IEC-104 to transport the direct serial link over the IP network, particularly for devices that only support the serial communication (e.g., legacy devices).

As shown in FIG. 1, assume that the terminal unit 1 is a remote terminal unit (RTU) that acts as a slave to a master terminal unit (MTU) located on terminal unit 2. It should be noted that the following is brought only as an example and the same explanation equally applies to a balanced mode wherein the RTUs communicate in a peer-to-peer relationship. (Notably, as used herein, a "local terminal unit" implies any type of terminal unit that is attached locally to the router, while "remote terminal unit" implies any type of terminal unit that is located in a remote site beyond the IP network. As such, "RTU" should be used to imply only a specific name of a terminal unit according to the specific utility example given herein.) According to the translation illustratively used to interconnect the serial data links over the IP network, Router 1 (an RTU router) 120 may act as master to the RTU over data link 1 ("DL1"), and as a slave to Router 2 (router 125) in a server/client relationship. That MTU router may then act as the slave to the master MTU 115 over data link 2 (DL2).

In this setup, the translation process 248 of Router 1 (120) translates the serial (e.g., IEC-101) messages from the RTU 110 (a slave device) and transmits them as IP packets (e.g., IEC-104 messages) to Router 2 (125). Router 2 (125) may then translate those IP packets back to serial messages (e.g., IEC-101), and transmits those messages over DL2 to the MTU 115 (e.g., a SCADA control). This double translation allows the MTU 115 to receive the native serial traffic. The downside of a protocol translation such as this is the loss of end-to-end state visibility, and in particular, visibility of link failures etc. That is, when link layer failures happen locally, they are not visible remotely, and as such they may cause the two end points (e.g., RTU and MTU) to get out of sync, e.g., resulting in degradation of the overall grid operations.

In such a network as illustrated above, if there is a communication failure between the RTU 110 and Router 1 (at the physical layer or at the data link layer), then this will not be seen by the MTU 115 since the link layer between Router 2 and MTU 115 remains up. Similarly any Data Link Layer or Physical Layer communication failure between the MTU and Router 2 (at the physical layer or data link layer) will not be seen by the RTU connected to Router 1, since the failed Data Link session is terminated by the Router 2.

In this topology, Router 1 knows the status of the local serial data link DL1 and its IP session with Router 2. But Router 1 does not have visibility into the status of the remote serial data link DL2. Similarly Router 2 knows the status of its local serial session DL2 and the IP session with Router 1, but does not have visibility into the status of the session DL1. This creates an unacceptable deficiency in terms of management of the end-to-end solution for utilities which may affect the operation of the grid or alternatively slow down the migration to IP based technology.

Another problem with existing systems that transport serial communications (e.g., IEC-101) over IP networks (e.g., IEC-104) is that a failure of a single RTU or DL1 link may cause network flapping resulting in high resource consumption (e.g., processing power) of the MTU 115. That is, because MTUs usually serve multiple RTUs, a single failure of an RTU may degrade the operations of the peer MTU, thus affecting the operations of multiple other RTUs.

In order to explain the flapping problem, assume, for example, that the link DL1 goes down for an extended period of time. With existing systems, MTU 115 will periodically transmit messages polling RTU 110 for information. Given the fact that the link DL2 is up, MTU 115 assumes that it has an operational connectivity with RTU 110. As the polling message goes unanswered, MTU 115 attempts to restart RTU 110 by initiating a restart sequence over DL2 resulting in a restart of a state machine in router 125. As the state machine completes its restart, it notifies MTU 125 that it has been initialized and is ready to resume communication. MTU 115 resends the polling message to RTU 110, however, because the link DL1 is still down, the polling message goes again unanswered, resulting in MTU 125 timing out on the message and initiating the restart process again. Even though the RTU (DL1) is still down, the bring-up of the DL2 link layer is successful because it terminates at the Router 2, which is fully operational.

Since the RTU (DL1) is still down (over an extended period of time), Router 2 will go though the restart procedure (at an interval determined by configured parameters). The description above illustrates that the restart procedure, which was designed for resolving issues when RTU 110 was directly connected to MTU 115 (e.g., over a PSTN modem connection), is not adequate when RTU 110 is connected to MTU 115 over an intermediate IP network which terminates the IEC-101 protocol on both sides of the IP network. Additionally, this flapping scenario may fill up error logs of the various system components and may make debugging and troubleshooting of these networks much more difficult.

According to embodiments of the disclosure, therefore, the status of the end point's serial data links (e.g., including the IEC-101 sessions) may be communicated over the IP session (e.g., IEC-104 session) between Router 1 and Router 2, for example, using an OAM (Operations, Administration, and Maintenance/Management) message 150 (FIG. 1), and the local serial data links may be brought up or down based on the status of the remote serial data link. For example, a new state machine 300 may be defined within the translating routers 200 that may be used to correspondingly control the state of the local serial data link, when controllable, while bringing into account the remote state of the remote serial data link. In this manner, serial communication states on either end of an IP connection may be synchronized in order to avoid problems associated with serial sessions over IP network. (Notably, if the IP session 103 goes down, both serial sessions may be brought down as well.)

In other words, until a local router 120 indicates to a remote router 125 that the local serial data link DL1 is restartable, and vice versa, the remote router 125 may keep the remote terminal unit 115 from attempting to restart and waste resources. When the local serial link DL1 is brought back up, thus signaling to the local router 120 that it can communicate and restart the serial session, then the local router can inform the remote router 125 that the link is restartable. As such, if the remote router can bring up the remote serial data link DL2, then the remote terminal unit 115 issues a restart, reestablishing the communication session 145 between the two end points. That is, unless both routers say that the serial session is restartable, neither router attempts to (or allows an attempt to) restart the session, accordingly.

Figure 3:
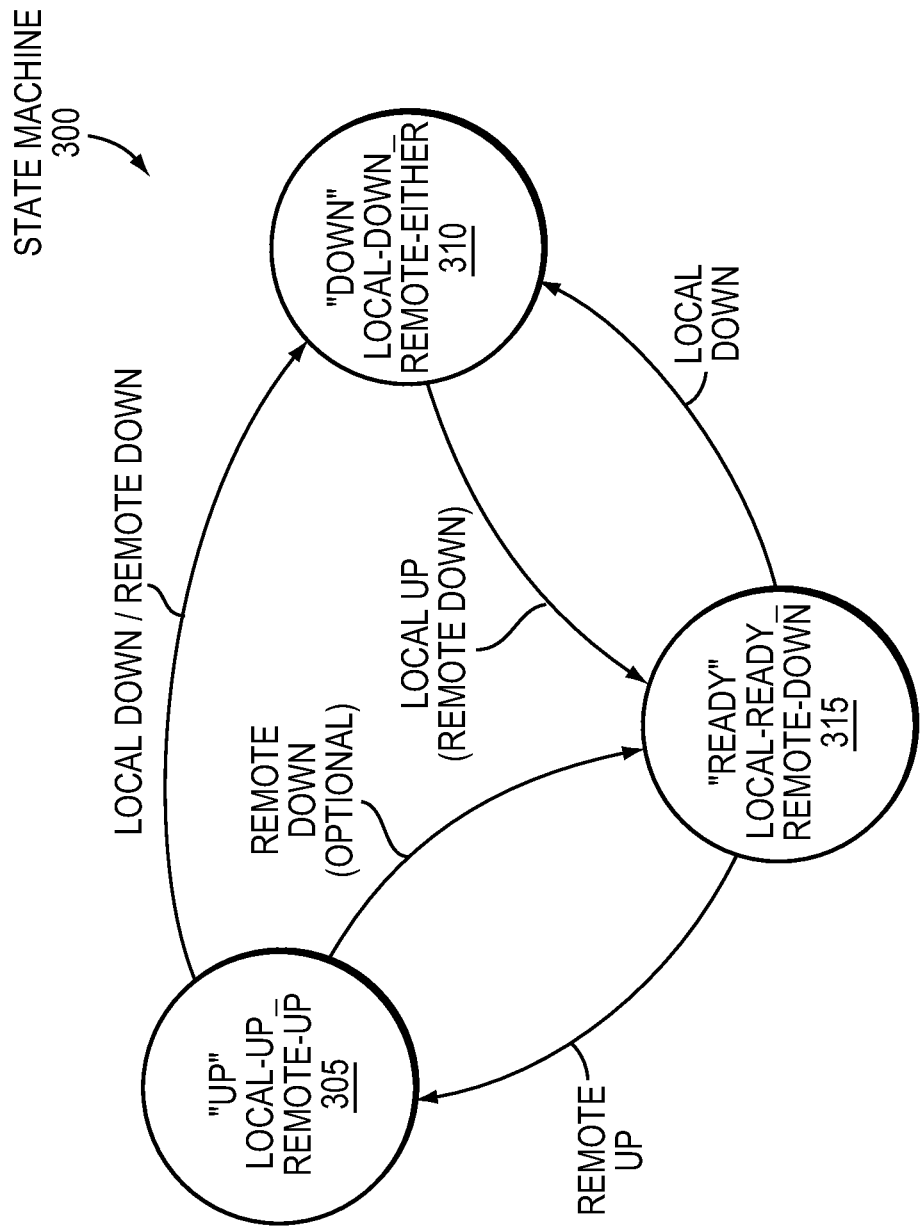
FIG. 3 illustrates an example state machine.

Illustratively, the techniques described herein may be performed by hardware, software, and/or firmware, such as in accordance with a serial-to-IP translation process 248 configured accordingly, which may contain computer executable instructions executed by the processor 220 to perform functions relating to the novel techniques described herein, e.g., in conjunction with state machine 300 (e.g., a finite state machine) as also described herein with reference to FIG. 3.

Operationally, each router 200 may maintain a communication session 145 between a local terminal unit 110 or 115 and a remote terminal unit (115 or 110), in a manner as described above with reference to FIG. 1. For instance, the local terminal unit is interconnected to a particular router over a local serial data link 102, while the remote terminal unit (remote to the particular router) is interconnected to the particular router over the IP session 103 via a remote router and a corresponding remote serial data link. As noted above, an illustrative, and non-limiting, embodiment may be one such that the IP session conforms to an IEC-104 protocol and/or the serial data links conform to an IEC-101 protocol.

While existing link layer protocols generally define 'up' state 305 and 'down' state 310 for link layers DL1 and DL2, a system in accordance with the embodiments herein defines a new state, namely a 'ready' state 315. This new state may be tracked by the state machine 300 of both routers. A router is defined to be in a ready state if its own local DL link can be brought up, but the remote DL of its peer router cannot be (is down). This may also be referred to as a "local-ready_remote-down" state. For example, Router 2 is in ready state if DL2 can be brought up but Router 1 informed it that DL1 cannot be brought up. Similarly, Router 1 is in a ready state if DL1 can be brought up but Router 2 has informed it that it cannot bring up DL2. Alternatively, either router is considered in the up state when both serial data links are up, and down when at least their local serial data link is down. (Notably, in the "down" state 310, two separate states may alternatively be maintained. In particular, a "local-down_remote-down" state exists when both the local link and remote link are down, while a separate state "local-down_remote-ready" may also be maintained if the local link is down but the remote link is ready. As shown herein for brevity, "down" state 310 is shown as "local-down_remote-either."

In accordance with one or more embodiments herein, Router 1 and Router 2 may monitor their respective local serial data link states, and may establish an OAM session over the IP session (e.g., an extension to the IEC-4 protocol, extension to an OAM protocol, or alternatively as a new message protocol). This session is used to communicate between the routers the state of the serial data links (OAM messages 150), thus updating and allowing the synchronization of the state machines 300 of these two routers. This synchronization session can take place over an established IEC-104 session, as an in-band communication, or as a proprietary out of band OAM session between Router 1 and Router 2. Illustratively, the OAM messaging may use IEC-104 Type Identifiers that are unused by the current IEC-104 standard at the IEC-104 Application Layer to send the OAM messages, but with a third state of 'READY' in addition to the conventional 'up' and 'down' states. Note that the OAM communication messages 150 generally remain between the routers 200, and are not sent to the terminal units 110/115.

In the above network, Router 1 may periodically transmit the status of its local connection DL1 over the IP session to Router 2. Similarly, it may also periodically receive and process the IP messages from Router 2 that contain the connection status of the remote (to Router 1) connection DL2. The periodicity of these messages can be made configurable on each of these routers, and generally both Router 1 and Router 2 may be configured with the same periodicity. In accordance with one or more additional embodiments, a system wide periodicity of the messages may be defined and dynamically propagated amongst the routers over the OAM messages.

With the communication of local and remote serial data link states, the state of the respectively local serial data link may be controlled, when controllable (i.e., when the local session is not down uncontrollably), while considering the remote state of the remote serial data link, thus synchronizing the end points' serial data link states as described herein (e.g., to match the remote state). In accordance with one or more embodiments, whenever a serial date link session is configured to have OAM operational, it can be said that the serial data link has a local OAM end-point which would terminate OAM messages received from across the translated IP session. This configured local OAM end-point also originates OAM messages indicating the status of its serial data link across the IP session.

In response to detecting a down state of the local serial data link, a local router transmits the down state to the remote router over the IP session. Conversely, whenever a local router (OAM end-point) receives a message indicating that the remote serial data link is down, it will bring down the local serial data link and move the local state machine 300 to a down state 310. Alternatively, the illustrative action of "bringing down the local session" may imply entering a locally ready state 315 (Local-Ready_Remote-Down), rather than first entering the down state.

While in the down state (or ready state), the local router may continue determining the presence of its local terminal unit peer. Illustratively, the routers may be configured to operate as either a "master" device or "slave" device according to its role for the corresponding serial data link, or may instead be equal peers when the serial data links are in a peer-to-peer arrangement. For example, in response to the router acting as a master station, it may send periodic link status requests to the local (slave) terminal unit and await a response (where, notably, the requests and responses may be simple voltage levels on select pins, as may be appreciated by those skilled in the art). If the probing results in receiving a positive response, the local session will be considered (determined as) 'ready' and an OAM message 150 is transmitted to the remote router (OAM end point) indicating the status. Notably, however, the local state machine does not progress to bring up the local serial data link, thus keeping it waiting in this Local-Ready_Remote-Down state until it receives a similar 'ready' (or 'up') message from the remote router serial data link. Upon receiving the ready or up message, the local serial data link may then be brought up. In the case of a negative response or lack of response from the slave local terminal unit, the OAM messaging may continue to declare the local session as down, or transition to a down state if in the ready state, until a positive response is obtained.

Alternatively, in response to the router acting as a slave station, it may wait to receive a link status request from the local (master) terminal unit. Upon receiving such a link status request, the router may determine that the local serial data link is ready, and may consider itself within a ready state. Accordingly, the ready state may be transmitted in an OAM message 150 to the remote router. The local state machine may reflect a Local-Ready_Remote-Down state and is kept in that state (with the session down, but ready) until receiving a communication from the remote router indicating that the remote serial data link is up. Note also that the local router may be configured to not respond to the above link status request until the communication from the remote router is received is indicating that the remote serial data link is up, as the response would generally be used to bring the local serial data link up.

As a further alternative, if the router is acting in a peer-to-peer arrangement, the router may simply await notification (e.g., a specified voltage on a specified serial link pin) from the terminal unit that the local link is 'ready', and in response, transmit an OAM message 150 to the remote router indicating the status. Again, the local state machine may not progress to bring up the local serial data link until it receives a similar 'ready' (or 'up') message from the remote router regarding the remote serial data link, and may not respond to the notification (e.g., with a reply voltage) until the communication from the remote router is received indicating that the remote serial data link is up.

Said differently, in any situation above, whenever a local serial data link is in the ready state (Local-Ready_Remote-Down), upon receiving a remote serial link status of either 'ready' or 'up', the corresponding router brings up the local serial data link and transitions the state to up 305. By synchronizing the end-session states, the techniques above thus avoid the problem of flapping at one end when the other end session is down for an extended period of time.

Figure 4:
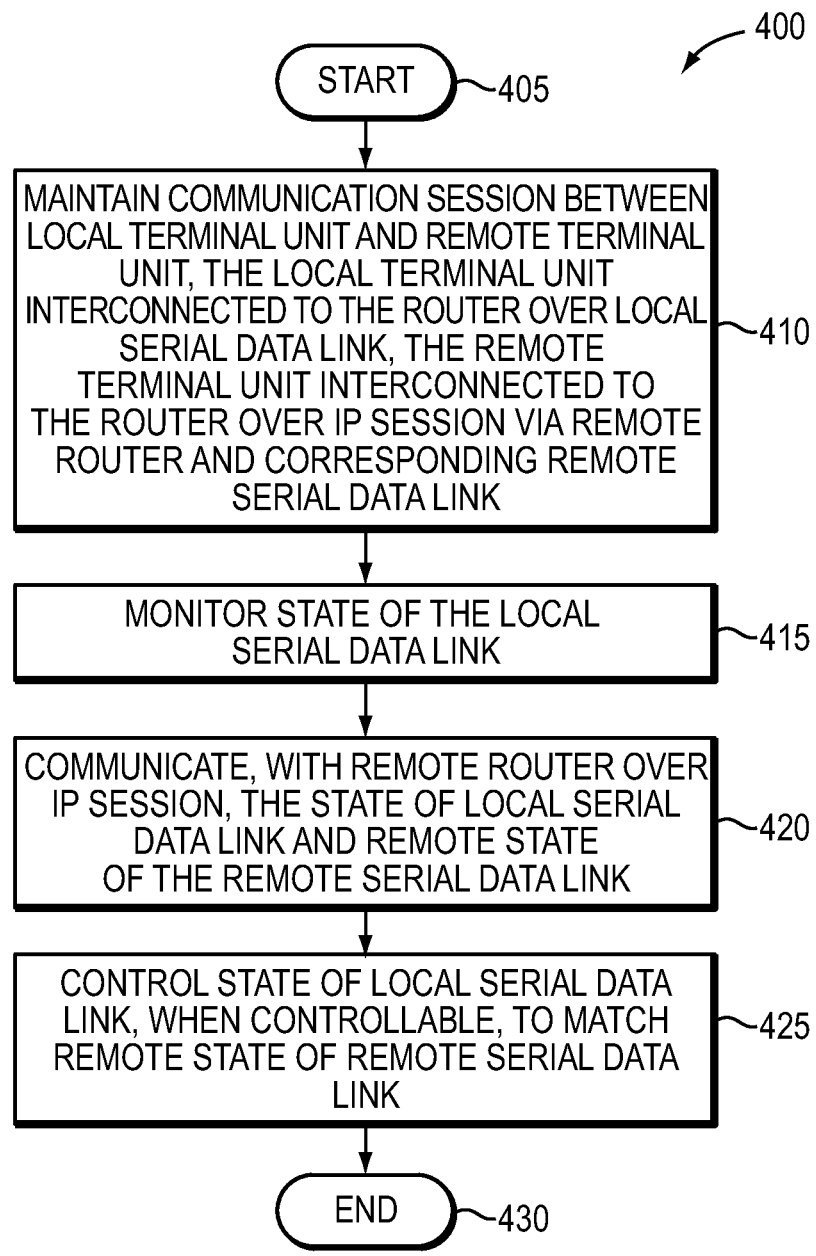
FIG. 4 illustrates an example procedure for synchronizing serial data link state across an intervening IP network.

FIG. 4 illustrates an example simplified procedure for synchronizing serial data link state across an intervening IP network in accordance with one or more embodiments described herein. The procedure 400 starts at step 405, and continues to step 410, where a particular router 200 (e.g., 120 or 125) maintains a communication session 145 between a local terminal unit (110 or 115, respectively) and remote terminal unit (115 or 110, respectively), as shown in FIG. 1. Each router 200 may then monitor the state of its local serial data link in step 415, and in step 420 communicates the state of local serial data link and remote state of the remote serial data link with the remote router over the IP session 103 (i.e., the local router communicates the local state to the remote router, and the remote router communicates the remote state to the local router). As described in detail herein, in step 425 the state of the local serial data links may be controlled, when controllable, to match the remote state of remote serial data link, accordingly, and the procedure 400 ends in step 430.

Figure 5:
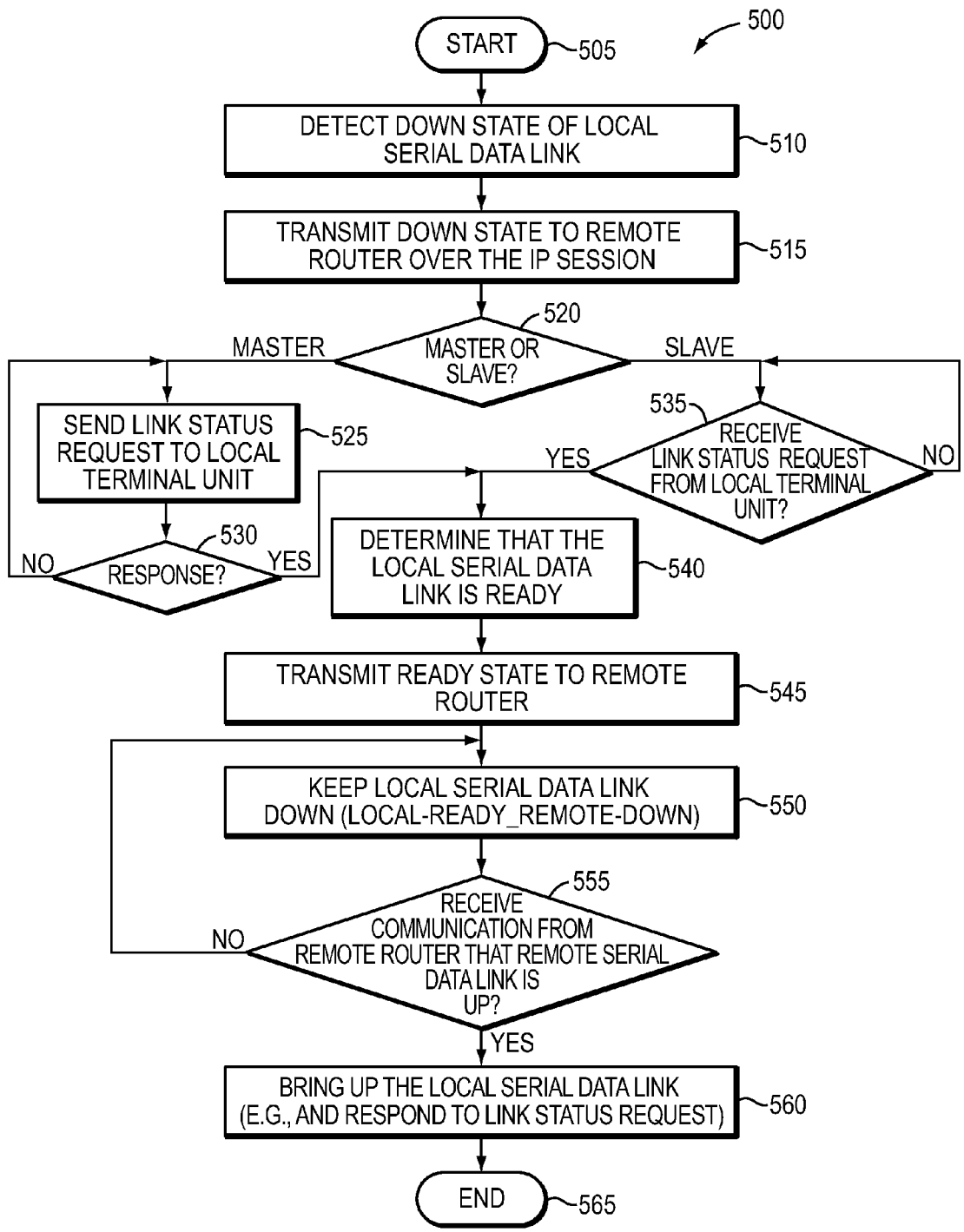
FIG. 5 illustrates an example procedure for managing a local down state when synchronizing serial data link state across an intervening IP network.

FIG. 5 illustrates an example simplified procedure for managing a local down state in accordance with one or more embodiments described herein. For instance, the procedure 500 starts at step 505, and continues to step 510, where a router 200 detects a down state of a local serial data link, such as a lack of communication or explicit, e.g., voltage, indicating a downed state. As such, in step 515, the detecting router may transmit the down state to the remote router over the IP session 103, as noted herein. Assuming a master/slave relationship (as opposed to a peer-to-peer relationship), then depending upon whether the detecting router is a master device or slave device within the corresponding serial data link in step 520, the router may act differently once the down state was detected. For example, when master, in step 525 the router may send a link status request to the local terminal unit in order to determine in step 530 whether there is a response. If so, then in step 540, the router may determine that the local serial data link is ready. Alternatively, when the router is acting as a slave device, then in response to receiving a link status request from the previously down local terminal unit in step 535, the router may determine in step 540 that the local serial data link is ready.

Upon determining that the local serial data link is ready, then in step 545 the ready state may be transmitted to the remote router, though in step 550, the local serial data link is kept down (e.g., Local-Ready_Remote-Down). This remains as such until in step 555 the local router receives communication from the remote router that the remote serial data link is up. At which time, in step 560, the local router may bring up the local serial data link (e.g., and respond to link status requests where acting as a slave device), and the procedure 500 ends in step 565.

Figure 6:
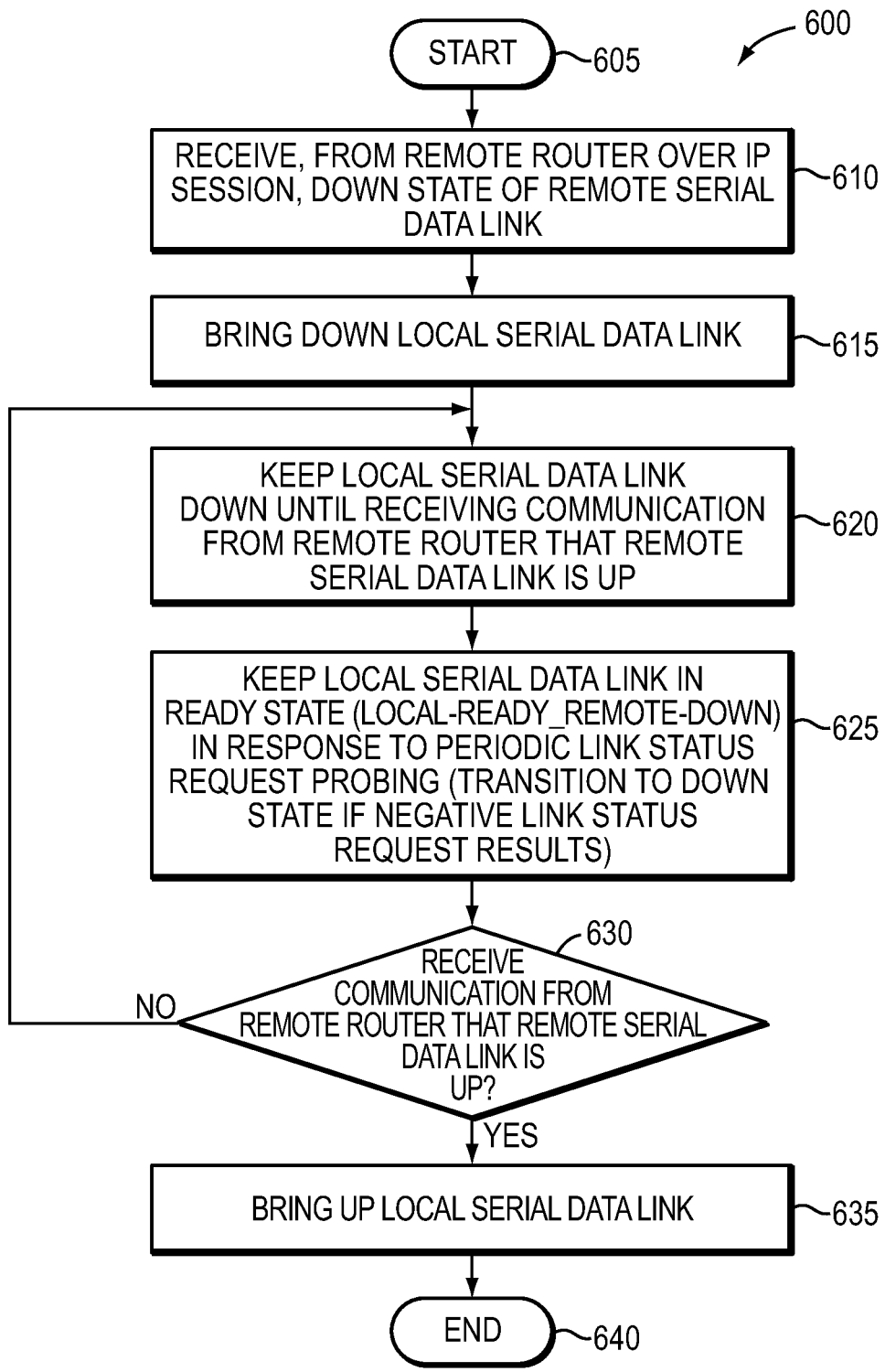
FIG. 6 illustrates an example procedure for managing a remote down state when synchronizing serial data link state across an intervening IP network.

Alternatively, FIG. 6 illustrates an example simplified procedure for managing a remote down state in accordance with one or more embodiments described herein. The procedure 600 starts at step 605, and continues to step 610, where a router receives from the corresponding remote router a communication indication a down state of the remote serial data link. Accordingly, in step 615, the receiving router brings down the local serial data link to synchronize the sessions, and in step 620 keeps the local serial data link down until receiving a communication from remote router that the remote serial data link is up. In addition, in step 625, the receiving router may also keep the local serial data link in a ready state (e.g., Local-Ready_Remote-Down) in response to periodic link status request probing, to ensure that the local link has not also gone down. In such a situation, in response to negative link status request results, the local state may be transitioned to a down state. Assuming that the local serial data link is ready, upon receiving communication from remote router in step 630 that the remote serial data link is up, the receiving router may bring up the local serial data link in step 635 (e.g., and may communicate this status back to the remote router). The procedure 600 ends in step 640.

The novel techniques described herein synchronize serial data link state across an intervening IP network. In particular, by defining a new finite state machine to be implemented in the routers, the state of the data links may be maintained and thus synchronized, accordingly. As such, the techniques above prevent resource-consuming flaps (bringing up and down) of the data links when any data link in the system goes down, and also minimize the time of bringing up the system after a link is restored. By preventing system flapping, the techniques above further prevent filling error logs of all system components (or rolling over in a circular buffer), and thus improve the ability of debugging issues in the field.

While there have been shown and described illustrative embodiments that synchronize serial data link state across an IP network, it is to be understood that various other adaptations and modifications may be made within the spirit and scope of the embodiments herein. For example, the embodiments have been shown and described herein where the IP session conforms to an IEC-104 protocol and the serial data links conform to an IEC-101 protocol. However, the embodiments in their broader sense are not so limited, and may, in fact, be used with other suitable protocols, such as proprietary protocols operating over the IP network. Also, while the above embodiments are directed to two routers at either end of an IP network, it may also be possible to have a single translation scenario, such as one router translating from a serial data link for an RTU (e.g., IEC-101 connection) to an MTU that is attached to the IP network (e.g., an MTU capable of IEC-104 communication). In this instance, the sole router may be configured to synchronize the serial data link with the IP session by itself, rather than communicating the synchronization information to another router to synchronize two serial data links. Further, as noted above, the techniques herein have generally been described with reference to master and slave communications. However, the embodiments herein equally apply to both master/slave configurations as well as to a balanced (peer-to-peer) relationship between the two entities on the serial link.

It should also be noted that one of the terminal units, particularly an MTU collocated with a SCADA Control) may terminate multiple sessions, and thus the corresponding router (e.g., Router 2) 125 may either host multiple state machines (one state machine for each serial end-session it terminates) or employ a multithreaded state machine capable of representing the states of multiple respective data links. In other words, each router may comprise either a plurality of state machines 300, each configured to maintain a particular state corresponding to each local serial data link and respective remote serial data link, or a multi-threaded state machine 300 configured to maintain states for local serial data links and respective remote serial data links. In this instance, each router may also comprise one or more serial data link network interfaces configured to communicate over one or more corresponding serial data links with one or more corresponding local terminal units. That is, each router may then maintain and monitor a plurality of communication links, communicates the state of each link, and control the state of each local serial data link, when controllable, to match the remote state of the respective remote serial data link.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
maintaining, by a router, a communication session between a local terminal unit and a remote terminal unit, the local terminal unit interconnected to the router over a local serial data link that utilizes an IEC-101 protocol, the remote terminal unit interconnected to the router over an Internet Protocol (IP) session via a remote router and a corresponding remote serial data link that utilizes the IEC-101 protocol;
monitoring, by the router, a state of the local serial data link;
communicating, between the router and remote router over the IP session, the state of the local serial data link and a remote state of the remote serial data link; and
controlling the state of the local serial data link by the router to match the remote state of the remote serial data link.

2. The method as in claim 1, further comprising:
in response to detecting a down state of the local serial data link, transmitting the down state to the remote router over the IP session.

3. The method as in claim 2, further comprising:
in response to the router being a master device for the local serial data link, sending a link status request to the local terminal unit;
determining that the local serial data link is ready if there is a response to the link status request from the local terminal unit; and, in response, transmitting the ready state of the local serial data link to the remote router.

4. The method as in claim 3, further comprising:
keeping the local serial data link down until receiving a communication from the remote router that the remote serial data link is at least one of either up or ready; and
in response to receiving the communication from the remote router that the remote serial data link is either up or ready, bringing up the local serial data link.

5. The method as in claim 2, further comprising:
in response to the router being a slave device for the local serial data link, receiving a link status request from the local terminal unit; determining that the local serial data link is ready in response to the link status request from the local terminal unit; and, in response,
transmitting the ready state of the local serial data link to the remote router.

6. The method as in claim 5, further comprising:
keeping the local serial data link down until receiving a communication from the remote router that the remote serial data link is at least one of either up or ready; and
in response to receiving the communication from the remote router that the remote serial data link is either up or ready, bringing up the local serial data link.

7. The method as in claim 5, further comprising:
responding to the link status request in response to receiving the communication from the remote router that the remote serial data link is up.

8. The method as in claim 1, further comprising:
in response to receiving, from the remote router over the IP session, a down state of the remote serial data link, bringing down the local serial data link.

9. The method as in claim 8, further comprising:
keeping the local serial data link down until receiving a communication from the remote router that the remote serial data link is at least one of either up or ready; and
in response to receiving the communication from the remote router that the remote serial data link is either up or ready, bringing up the local serial data link.

10. The method as in claim 9, further comprising:
keeping the local serial data link in a ready state in response to periodic link status request probing.

11. The method as in claim 10, further comprising:
in response to the router being a master device for the local serial data link:
  i) sending periodic link status requests to the local terminal unit; and
  ii) determining that the local serial data link is ready if there is a response to the link status request from the local terminal unit; and
in response to the router being a slave device for the local serial data link:
  i) receiving a link status request from the local terminal unit; and
  ii) determining that the local serial data link is ready in response to the link status request from the local terminal unit.

12. The method as in claim 10, further comprising:
transitioning the local serial data link to a down state in response to negative link status request results.

13. The method as in claim 1, wherein the IP session conforms to an IEC-104 protocol.

14. An apparatus, comprising:
a serial data link network interface configured to communicate over a serial data link that utilizes an IEC-101 protocol with a local terminal unit;
an Internet Protocol (IP) network interface configured to communicate over an IP session with a remote router;
a processor coupled to the network interfaces and adapted to execute one or more processes; and
a memory adapted to store a process executable by the processor, the process when executed operable to:
  maintain a communication session between the local terminal unit and a remote terminal unit, the remote terminal unit interconnected over the IP via the remote router and a corresponding remote serial data link that utilizes the IEC-101 protocol;
  monitor a state of the local serial data link;
  communicate, with the remote router over the IP session, the state of the local serial data link and a remote state of the remote serial data link; and
  control the state of the local serial data link to match the remote state of the remote serial data link.

15. The apparatus as in claim 14, wherein the process when executed is further operable to:
in response to detecting a down state of the local serial data link, transmit the down state to the remote router over the IP session; and
in response to receiving, from the remote router over the IP session, a down state of the remote serial data link, bring down the local serial data link.

16. The apparatus as in claim 14, wherein the process when executed is further operable to:
in response to the apparatus being a master device for the local serial data link:
  i) send periodic link status requests to the local terminal unit; and
  ii) determine that the local serial data link is ready if there is a response to the link status request from the local terminal unit; and
in response to the apparatus being a slave device for the local serial data link:
  i) receive a link status request from the local terminal unit; and
  ii) determine that the local serial data link is ready in response to the link status request from the local terminal unit.

17. The apparatus as in claim 14, wherein the process when executed is further operable to:
keep the local serial data link down until receiving a communication from the remote router that the remote serial data link is at least one of either up or ready; and
in response to receiving the communication from the remote router that the remote serial data link is either up or ready, bring up the local serial data link.

18. The apparatus as in claim 14, further comprising:
a plurality of serial data link network interfaces configured to communicate over a plurality of corresponding serial data links with a plurality of corresponding local terminal units;
wherein the process when executed is further operable to:
  maintain a communication session for each local terminal unit to one or more configured remote terminal units having corresponding remote serial data link;
  monitor a state of each local serial data link;
  communicate the state of each local serial data link and each of the one or more remote serial data links; and control the state of each local serial data link to match the remote state of the respective remote serial data link.

19. The apparatus as in claim 18, further comprising one of either a plurality of state machines each configured to maintain a particular state corresponding to each local serial data link and respective remote serial data link or a multi-threaded state machine configured to maintain states for local serial data links and respective remote serial data links.

20. A non-transitory computer-readable media having software encoded thereon, the software when executed by a processor on a device operable to:
   maintain a communication session between a local terminal unit and a remote terminal unit, the local terminal unit interconnected to the device over a local serial data link that utilizes an IEC-101 protocol, the remote terminal unit interconnected to the device over an Internet Protocol (IP) via a remote router and a corresponding remote serial data link that utilizes the IEC-101 protocol;
   monitor a state of the local serial data link;
   communicate, with the remote router over the IP session, the state of the local serial data link and a remote state of the remote serial data link; and
   control the state of the local serial data link to match the remote state of the remote serial data link.

21. The non-transitory computer-readable media as in claim 20, wherein the software when executed is further operable to:
   in response to detecting a down state of the local serial data link, transmit the down state to the remote router over the IP session; and
   in response to receiving, from the remote router over the IP session, a down state of the remote serial data link, bring down the local serial data link.

22. The non-transitory computer-readable media as in claim 20, wherein the software when executed is further operable to:
   in response to the device being a master device for the local serial data link:
      i) send periodic link status requests to the local terminal unit; and
      ii) determine that the local serial data link is ready if there is a response to the link status request from the local terminal unit; and
   in response to the device being a slave device for the local serial data link:
      i) receive a link status request from the local terminal unit; and
      ii) determine that the local serial data link is ready in response to the link status request from the local terminal unit.

23. The non-transitory computer-readable media as in claim 20, wherein the software when executed is further operable to:
   keep the local serial data link down until receiving a communication from the remote router that the remote serial data link is at least one of either up or ready; and
   in response to receiving the communication from the remote router that the remote serial data link is either up or ready, bring up the local serial data link.

* * * * *